United States Patent
Rash et al.

(10) Patent No.: US 7,260,114 B1
(45) Date of Patent: Aug. 21, 2007

(54) SYSTEM AND METHOD FOR TRACKING MULTILINK PACKET INFORMATION

(75) Inventors: Joseph Rash, Wake Forrest, NC (US); Herbert Rivera Sanchez, Durham, NC (US); Daniel Yingling, Apex, NC (US); Robert Oden, Raleigh, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 1108 days.

(21) Appl. No.: 10/213,238

(22) Filed: Aug. 6, 2002

(51) Int. Cl.
*H04J 3/24* (2006.01)
(52) U.S. Cl. .................... 370/473; 370/412
(58) Field of Classification Search ........ 370/470–471, 370/473, 412–418; 709/227–228
See application file for complete search history.

(56) References Cited

U.S. PATENT DOCUMENTS

2002/0107974 A1* 8/2002 Janoska et al. ............. 709/234
2002/0131425 A1* 9/2002 Shalom ...................... 370/401

* cited by examiner

*Primary Examiner*—Chi Pham
*Assistant Examiner*—Thai Hoang
(74) *Attorney, Agent, or Firm*—Law Office of Gerald Maliszewski; Gerald Maliszewski

(57) ABSTRACT

A system and method are provided for tracking connections in a network bundle including a plurality of network links. The method comprises: receiving packet fragments in a plurality of sampling rounds; for a current sampling round, recording which links have supplied a packet fragment; and, advancing a record of the received packet fragments in response a packet fragment on each link. Typically, the packet fragments are received with a corresponding first plurality of sequence numbers. Then, the lowest sequence number in the completed current sampling round is recorded. Some aspects of the method additionally comprise: for the current sampling round, establishing a flag register with a flag for each link; establishing a next lowest sequence number (Mn) register; and, establishing a current lowest sequence number (Mc) register. Then, a flag register flag is toggled in response to receiving a packet fragment on a corresponding link.

17 Claims, 11 Drawing Sheets

| | Link | | | Sampling Round |
|---|---|---|---|---|
| A | B | C | | |
| 1 | 2 | 3 | | 1 |
| 7 | 8 | 4 | | 2 |
| 9 | 10 | 5 | | 3 |
| 11 | 12 | 6 | | 4 |
| 13 | 15 | 16 | | 5 |
| 14 | — | — | | 6 |

Fragment Sequence Number

*FIG. 3*

| Link | Current flag register ($L_S$) | | |
|---|---|---|---|
| | A | B | C |
| Fragment Sequence Number | 1 | 1 | 1 |

| $M_n$ |
|---|
| 1 |

| $M_c$ |
|---|
| 1 |

*FIG. 4*

| Link | Current flag register ($L_s$) | | |
|---|---|---|---|
| | A | B | C |
| Fragment Sequence Number | 1 | 1 | 1 |

| $M_n$ |
|---|
| 4 |

| $M_c$ |
|---|
| 4 |

FIG. 5

| Link | Current flag register ($L_s$) | | |
|---|---|---|---|
| | A | B | C |
| Fragment Sequence Number | 1 | 1 | 1 |

| $M_n$ |
|---|
| 5 |

| $M_c$ |
|---|
| 5 |

*FIG. 6*

| Link | Current flag register ($L_S$) | | |
|---|---|---|---|
| | A | B | C |
| Fragment Sequence Number | 1 | 1 | 1 |

| $M_n$ |
|---|
| 6 |

| $M_c$ |
|---|
| 6 |

FIG. 7

| Link | Current flag register ($L_S$) | | |
|---|---|---|---|
| | A | B | C |
| Fragment Sequence Number | 1 | 1 | 1 |

| $M_n$ |
|---|
| 13 |

| $M_C$ |
|---|
| 13 |

*FIG. 8*

| Link | Current flag register ($L_S$) | | |
|---|---|---|---|
| | A | B | C |
| Fragment Sequence Number | 1 | 0 | 0 |

| $M_n$ |
|---|
| 14 |

| $M_c$ |
|---|
| |

FIG. 9

SYSTEM AND METHOD FOR TRACKING MULTILINK PACKET INFORMATION

BACKGROUND OF THE INVENTION

1. Field of the Invention

This invention generally relates to serial digital communications and, more particularly, to a system and method for calculating the value of M in the reception of multi-link traffic.

2. Description of the Related Art

In multi-link systems, a decision must be made to determine if a late arriving packet is lost. Request for Comments (RFC)-1990 is a specification defining an algorithm that determines when a late arriving packet can accurately be considered lost using a calculated value labeled "M". As defined in RFC-1990, which was advanced to standard status by the Internet Engineering Task Force in December 1999, a single twelve or twenty-four bit value must be maintained for each link within a bundle. While the M value is the most accurate means of determining that a late-arriving packet is lost, it is also very memory intensive.

For hardware implementations of the multi-link protocol that support thousands of connections, the method of calculating M as defined in RFC-1990, requires an amount of memory that prohibits the use of internal memory in a single chip solution. Current hardware implementations of the multi-link protocol avoid this problem by using a purely time based method of guessing when a late arriving packet is lost. This solution estimates to amount of time that the system will wait for an arriving packet fragment. While this solution requires little memory for the calculation of M, it wastes either connection bandwidth or packet resequencing resources in an environment of typical Internet traffic.

An estimate that is too small will cause packets that are late to be considered lost. When a packet, that has been previously determined to be lost, arrives, it must be discarded. Some upper layer protocols require discarded packets to be resent, thus consuming even more network bandwidth. An estimate that is too large requires that resequencing resources he consumed while waiting for a packet that is lost. These resources must be consumed because packets that are received while waiting for the late packet cannot be sent to the system until the late packet is determined to be lost. The problems associated with this purely time based solution are compounded when the implementation attempts to support connections with different bandwidths.

It would be advantageous if process were developed to calculate the value M that was not wasteful of either network resources or device memory.

SUMMARY OF THE INVENTION

The present invention accurately calculates M for a bundle without requiring that a twelve (or twenty-four) bit value be maintained for each link within a bundle. This memory efficient method of M value calculation for multi-link connections only requires two twelve (or twenty-four) bit values be maintained per bundle, as well as an additional value whose bit width equals the number of links in the bundle. This reduction in memory requirements permits M to be used in semiconductor devices that support thousands of connections. This method can also be used in software implementations of multi-link with the same memory requirement reduction.

Accordingly, in a packet information network, a method is provided for tracking connections in a network bundle including a plurality of network links. The method comprises: receiving a first plurality of packet fragments in a second plurality of sampling rounds; for a current sampling round, recording which links have supplied a packet fragment; and, advancing a record of the received packet fragments in response to receiving a packet fragment on each link in the current sampling round. Typically, receiving a first plurality of packet fragments includes receiving a first plurality of packet fragments with a corresponding first plurality of sequence numbers. Then, advancing a record of the received packet fragments includes recording the lowest sequence number in the completed current sampling round.

Some aspects of the method additionally comprise: for the current sampling round, establishing a flag register with a flag for each link; establishing a next lowest sequence number (Mn) register; and, establishing a current lowest sequence number (Mc) register. Then, recording which links have supplied a packet fragment in the current sampling round includes toggling a flag register flag in response to receiving a packet fragment on a corresponding link. Advancing a record of the received packet fragments includes: recording in the Mn register the lowest sequence number received in the current sampling round; and, recording in the Mc register, the value of the Mn register, in response to all the flags being toggled in the current sampling round.

Additional details of the above-described method, and a packet information receiver system for tracking connections in a network are provided below.

BRIEF DESCRIPTION OF THE DRAWINGS

FIG. 3 depicts a table that organizes the packet fragments by rounds.

FIG. 4 depicts the state of the present invention registers cross-referenced to the events shown in FIG. 2 and the table of FIG. 3, after the completion of sampling round 1.

FIG. 5 depicts the state of the present invention registers cross-referenced to the events shown in FIG. 2 and the table of FIG. 3, after sampling round 2.

FIG. 6 depicts the state of the present invention registers cross-referenced to the events shown in FIG. 2 and the table of FIG. 3, after sampling round 3.

FIG. 7 depicts the state of the present invention registers cross-referenced to the events shown in FIG. 2 and the table of FIG. 3, after sampling round 4.

FIG. 8 depicts the state of the present invention registers cross-referenced to the events shown in FIG. 2 and the table of FIG. 3, after sampling round 5.

FIG. 9 depicts the state of the present invention registers cross-referenced to the events shown in FIG. 2 and the table of FIG. 3, after sampling round 6.

DETAILED DESCRIPTION OF THE PREFERRED EMBODIMENTS

Figure 1:
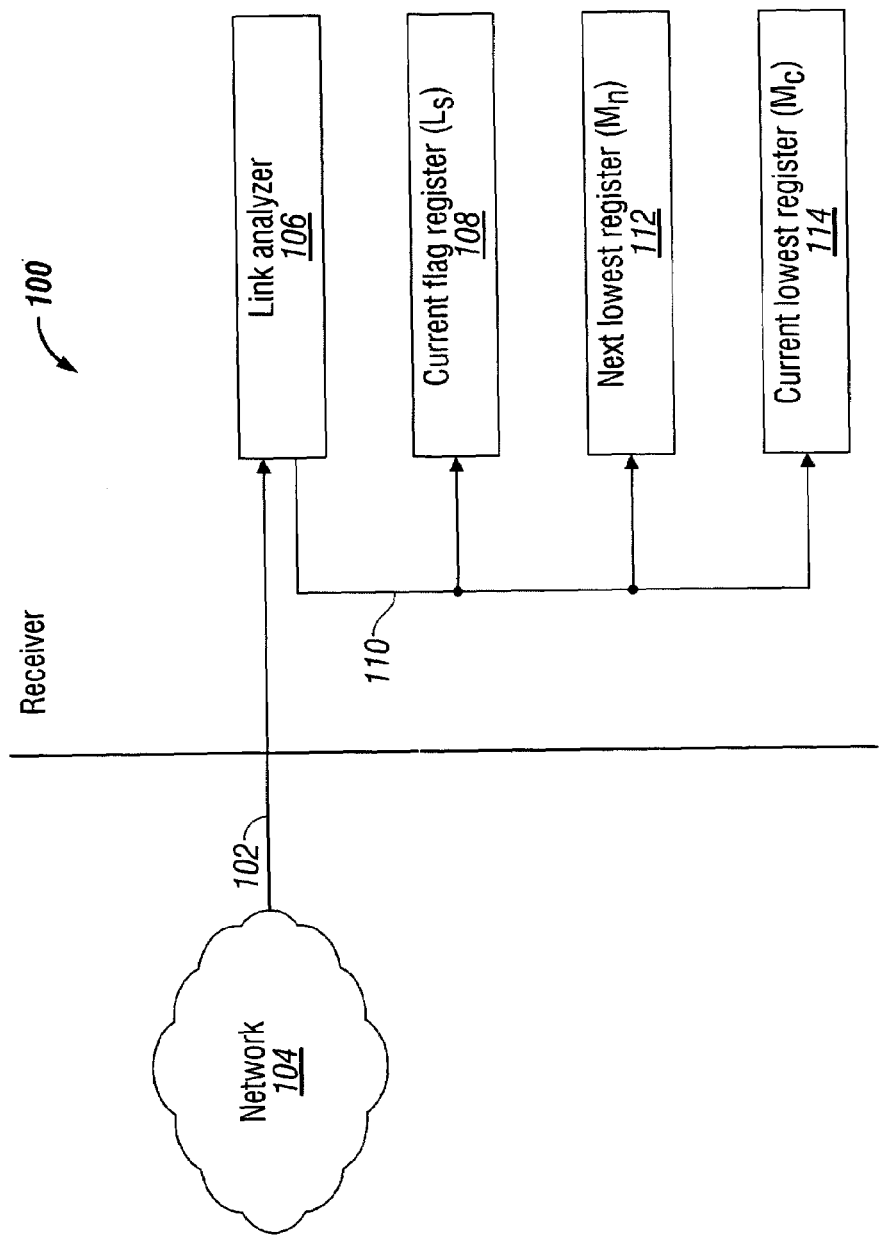
FIG. 1 is a schematic block diagram illustrating the present invention packet information receiver system for tracking connections in a network bundle including a plurality of network links.

FIG. 1 is a schematic block diagram illustrating the present invention packet information receiver system for tracking connections in a network bundle including a plurality of network links. The system 100 comprises a receiver input port on line 102 connected to a network 104. The receiver input port receives a first plurality of packet fragments in a second plurality of sampling rounds. A link analyzer 106 has a port connected to the receiver input port on line 102 to record which links have supplied a packet fragment in each sampling round. The link analyzer 106 advances a record of received packet fragments in response to receiving a packet fragment on each link in a current sampling round.

More specifically, the receiver input port receives a first plurality of packet fragments with a corresponding first plurality of sequence numbers. The link analyzer 106 records the lowest sequence number after a packet fragment has been received on each link in the current sampling round.

The system 100 further comprises a current sampling round flag register 108, with a port connected to the link analyzer port on line 110. The current sampling round flag (LS) register 108 maintains a flag bit for each link. A next lowest sequence number (Mn) register 112 has a port connected to the link analyzer port on line 110. Likewise, a current lowest sequence number (Mc) register 114 has a port connected to the link analyzer port on line 110.

Figure 2:
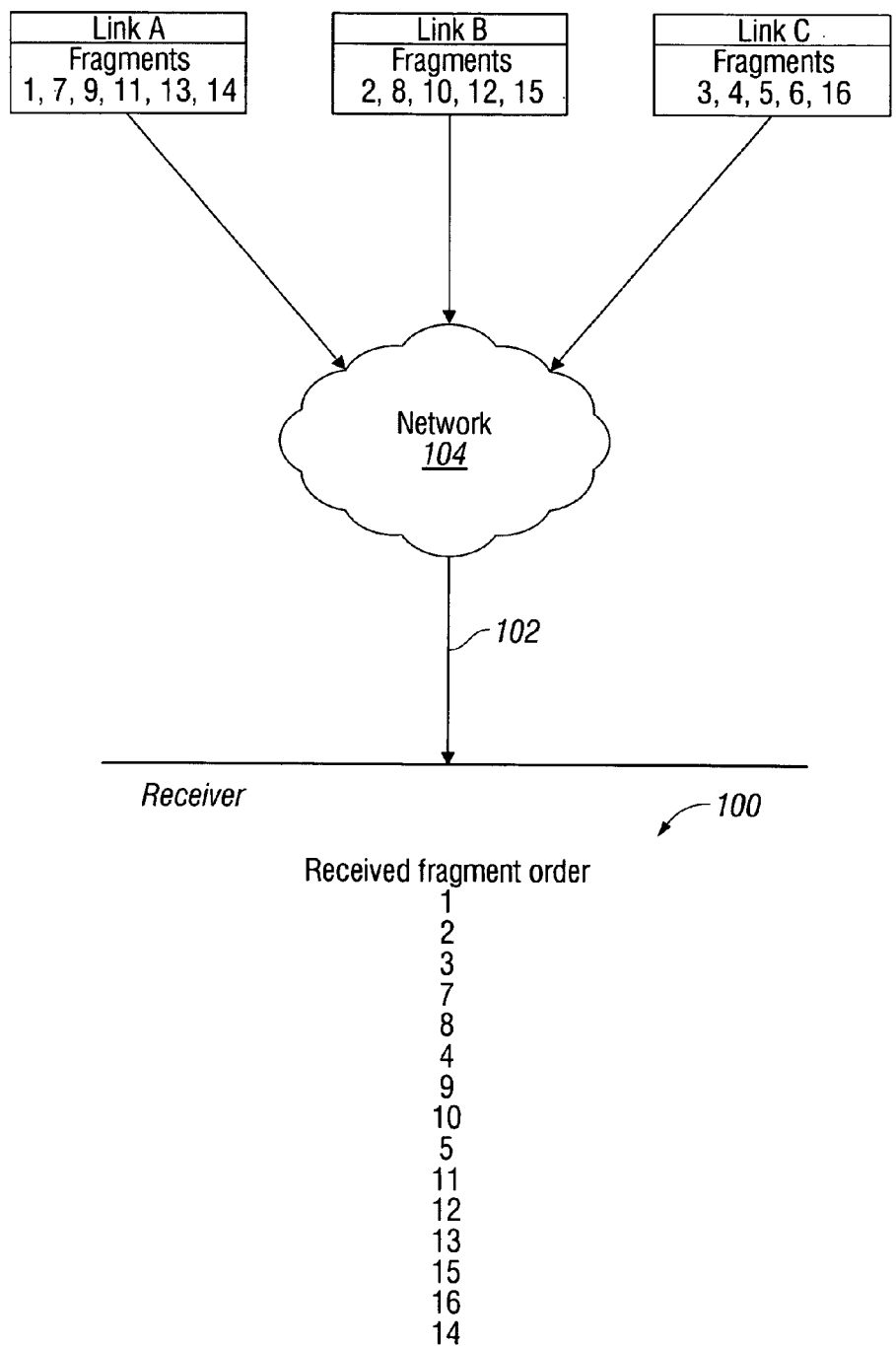
FIG. 2 is a drawing depicting an exemplary network bundle communication pattern.

FIG. 2 is a drawing depicting an exemplary network bundle communication pattern. The system 100 is receiving packet fragments from three different links: Link A, Link B, and Link C. In some aspects, line 102 represents a plurality of T1 line network connections connected to the receiver input port. The fragments may have initially been sent from a single source transmitter and are all part of the same message. The fragments may have been distributed across the three links in order improve the network throughput. Further, the links may be communicating using different bandwidths. The system 100 receives packet fragments identified with a sequence number from the three links, but not necessarily in the same order as transmitted. The drawing shows that the fragment sequence numbers were received in the following order:

1
2
3
7
8
4
9
10
5
11
12
13
15
16
14.

FIG. 3 depicts a table that organizes the packet fragments by rounds. Groups of fragments, one from each link, are organized as in a plurality of rounds. The entire group of packet fragments (or rounds) makes up a bundle. For example, packet fragment sequence numbers 1, 2, and 3 form a round (round 1).

FIG. 4 depicts the state of the present invention registers cross-referenced to the events shown in FIG. 2 and the table of FIG. 3, after the completion of sampling round 1. The link analyzer toggles a flag bit in the flag register in response to receiving a packet fragment on a corresponding link in the current sampling round. For example (as shown), after receiving fragments 1, 2, and 3, the current flag register records a "1" for Link A, a "1" for Link B, and a "1" for Link C. Before packet fragment 3 was received (not shown), the Link C flag would have been a "0".

The link analyzer records the lowest sequence number received in the current sampling round into the Mn register. Returning to the example depicted in FIG. 4, the Mn register records a 1 (for packet fragment sequence number 1) after having received packet fragment sequence numbers 1, 2, and 3. The link analyzer records in the Mc register, the value existing in the Mn register (packet fragment sequence number 1), after receiving a packet fragment for each link in the current sampling round. That is, the flag register toggles all the flag bits (from "0" to "1") in response to receiving a packet fragment on each link in the current sampling round. The link analyzer determines that the current sampling round is completed in response to reading the (all "1") flag bits in the flag register. Then, the link analyzer resets the flag register after the current sampling round is completed.

FIG. 5 depicts the state of the present invention registers cross-referenced to the events shown in FIG. 2 and the table of FIG. 3, after sampling round 2. Note that initially (before a fragment is received from Link C), the sequence number 7 would loaded into register Mn. The value in the Mn register only changes to 4 after a packet fragment is received from Link C in the current ($2^{nd}$) round.

FIG. 6 depicts the state of the present invention registers cross-referenced to the events shown in FIG. 2 and the table of FIG. 3, after sampling round 3.

FIG. 7 depicts the state of the present invention registers cross-referenced to the events shown in FIG. 2 and the table of FIG. 3, after sampling round 4.

FIG. 8 depicts the state of the present invention registers cross-referenced to the events shown in FIG. 2 and the table of FIG. 3, after sampling round 5.

FIG. 9 depicts the state of the present invention registers cross-referenced to the events shown in FIG. 2 and the table of FIG. 3, after sampling round 6. In this scenario, the link analyzer would determine that the entire bundle had been received in response to receiving an (E)nding bit in one of the packet fragments.

Functional Description

This present invention algorithm calculates M with only three variables being stored per bundle. The Mn and Mc registers store either twelve or twenty-four bit values, depending on the multi-link protocol in use. A value is stored in the flag register whose bit width is equal to the number of links in the bundle.

The variables are as follows:

Mn: M next. This is the lowest sequence number of all packets received on all links that have received a packet during the current sampling round.

Mc: M current. This is the latest M value obtained when at least one packet has been received on each link within a bundle. This value is synonymous with the M value defined in RFC-1990.

LS: Link sampled flag. The bit width of this variable equals the number of links in the bundle. When a packet is received on a link, the link's corresponding bit in this flag is set. When at least one packet has been received on each link, this variable is cleared, Mc is set to Mn and another sampling round is started.

The algorithm: Assuming that a multi-link packet with sequence number, SN, has been received on link N.

If this is the first packet in the sampling round, indicated by LS equal to zero:
Set bit N of LS to true ("1");
Set Mn to equal SN.
Else:
Set bit N of LS to true;
if SN is less than Mn, then set Mn equal to SN.
If a packet has been received on each link in the bundle, indicated by all bits in LS being true:
Set all bits in LS to false ("0"); and,
Set Mc equal to Mn.

The present invention is useful in transmitting packets using multilink network protocols such as MLFR, Multi Link Frame Relay, or MLPPP, Multi Link Point to Point Protocol. These multilink protocols allow the aggregation of multiple physical channels, T1/E1 links for example, into a single virtual link called a bundle. This ability to aggregate links allows a network to increase its bandwidth beyond a T1/E1 rate without having to purchase a T3 line. On the transmitting end of a network employing multilink, packets are fragmented, given a multilink header, which includes a sequence number, and transmitted on any of the links that compose the bundle. Each link is an independent link that may or may not share a common geographical path with other links. At the receiving end of a network employing multilink, packet fragments are resequenced using the sequence number contained in the multilink header and recombined into the original packet. Since each link of a bundle may have a different geographical path, the arrival order will likely not match the transmission order. Determining whether a packet fragment is late due to transmission time differences between links or lost due to network errors can quickly and accurately be performed using M.

The sequence numbers of fragments sent on a bundles link always increase in value. The receiver keeps track of the incoming sequence numbers on each link in a bundle and maintains the current minimum of the most recently received sequence number over all the member links in the bundle (call this M). This is because of the increasing sequence number rule over the bundle or any individual link.

The present invention has many advantages over the prior art. First, there are reduced memory requirements. For example, in a bundle of twelve links carrying FTP traffic with twenty-four bit sequence numbers, twelve twenty-four bit values, 288 bits in total, are required to calculate M using the current method described in RFC-1990. The present invention only requires two twenty-four bit values and one twelve bit value, 60 bits in total. This is an eighty percent reduction in memory requirements per connection. For a solution that supports 16K connections this is a memory savings of 4.7 megabits of memory.

Second, connection bandwidth is used more efficiently. Solutions that are purely time based waste connection bandwidth if the estimated time given a packet to arrive is too small. Using the M value to determine when a packet is lost is the most accurate means of determining when to stop waiting for a late packet. Packets that are late will never be classified as lost when using M, therefore packets that are late and not lost will not be discarded.

Third, resequencing resources are used more efficiently. Solutions that are purely time based waste resequencing resources if the estimated time given a packet to arrive is too large. The use of M is the most accurate and fastest means of determining when a packet is lost. Resources will not be consumed while waiting for a packet that is lost.

Figure 10:
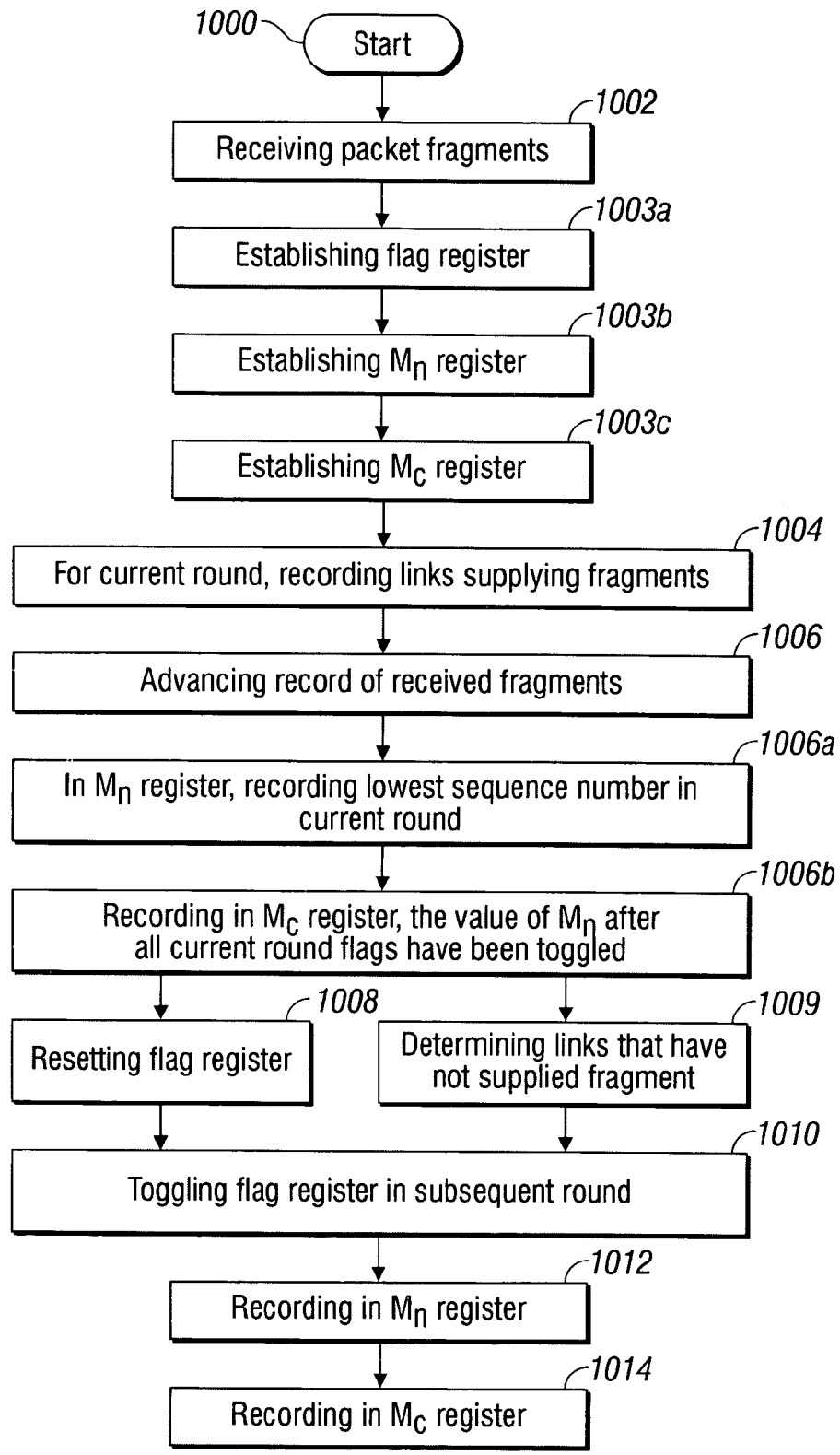
FIG. 10 is a flowchart illustrating the present invention method for tracking connections in a network bundle including a plurality of network links.

FIG. 10 is a flowchart illustrating the present invention method for tracking connections in a network bundle including a plurality of network links. The method is used in a packet information network. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1000. Step 1002 receives a first plurality of packet fragments in a second plurality of sampling rounds. Step 1004, for a current sampling round, records which links have supplied a packet fragment. Step 1006 advances a record of the received packet fragments in response to receiving a packet fragment on each link in the current sampling round.

In some aspects of the method, receiving a first plurality of packet fragments in Step 1002 includes receiving a first plurality of packet fragments with a corresponding first plurality of sequence numbers. Then, advancing a record of the received packet fragments in Step 1006 includes recording the lowest sequence number in the completed current sampling round. In other aspects, receiving a first plurality of packet fragments in a second plurality of sampling rounds (Step 1002) includes receiving packet fragments on a plurality of T1 lines.

Some aspects include further steps. Step 1003a, for the current sampling round, establishes a flag register with a flag for each link. Step 1003b, establishes a next lowest sequence number (Mn) register. Step 1003c establishes a current lowest sequence number (Mc) register.

Some aspects include a further step, Step 1009, of determining which links have failed to supply a packet fragment in each sampling round.

In other aspects, recording which links have supplied a packet fragment in the current sampling round in Step 1004 includes toggling a flag register flag in response to receiving a packet fragment on a corresponding link. Then, advancing a record of the received packet fragments includes substeps. Step 1006a records in the Mn register the lowest sequence number received in the current sampling round. Step 1006b records in the Mc register, the value of the Mn register, in response to all the flags being toggled in the current sampling round.

Some aspects of the method include further steps. Step 1008 resets the flag register after all the flags have been toggled. Step 1010 toggles a flag register flag in response to receiving a packet fragment on a corresponding link in a subsequent sampling round. Step 1012 records in the Mn register the lowest sequence number received in the subsequent sampling round. Step 1014 records in the Mc register, the value of the Mn register, in response to all the flags being toggled in the subsequent sampling round.

Figure 11:
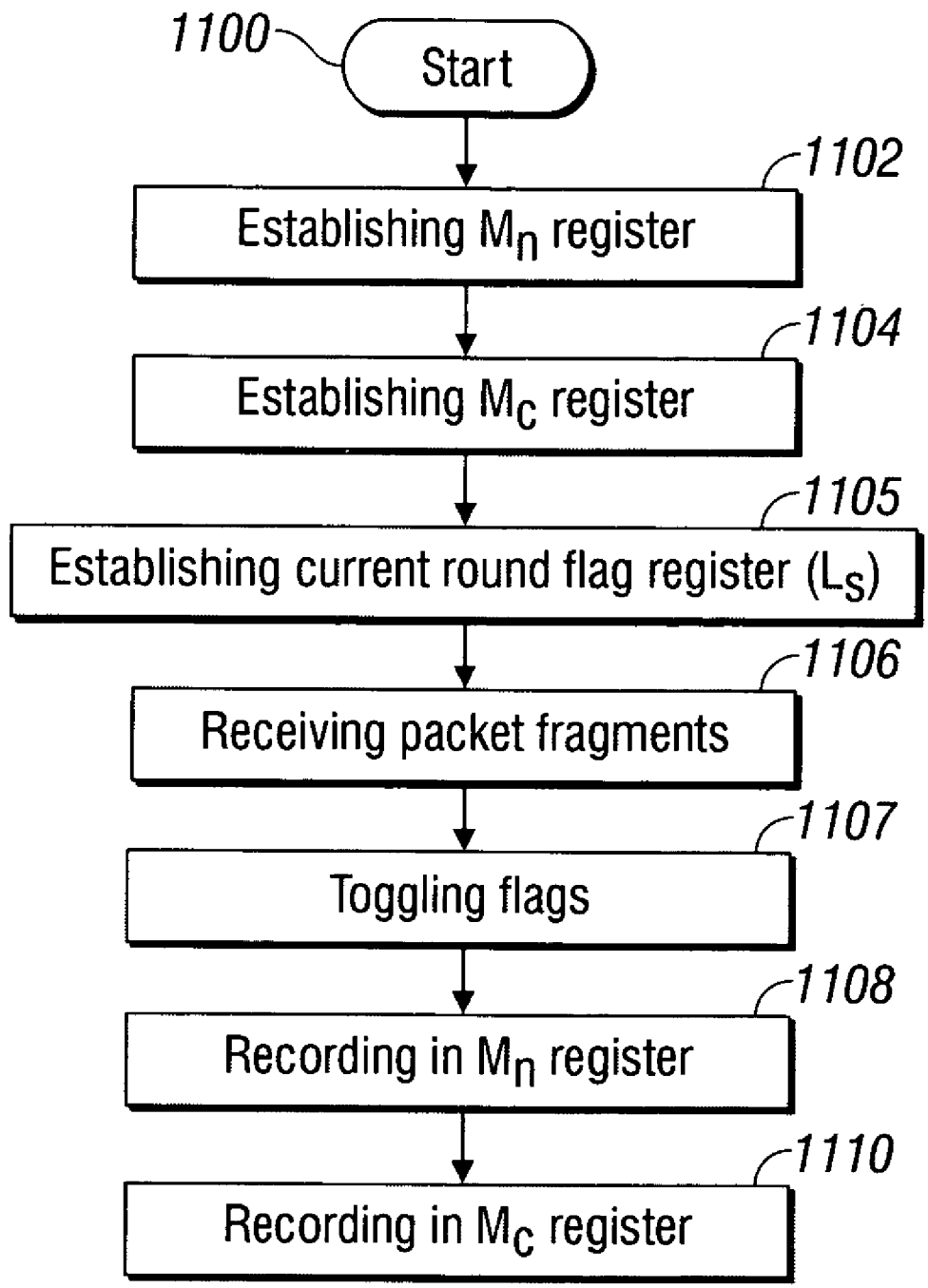
FIG. 11 is a flowchart illustrating an alternate aspect of the method of FIG. 10.

FIG. 11 is a flowchart illustrating an alternate aspect of the method of FIG. 10. The method starts at FIG. 1100. Step 1102 establishes a next lowest sequence number (Mn) register. Step 1104 establishes a current lowest sequence number (Mc) register. Step 1106 receives a first plurality of packet fragments, with a corresponding first plurality of sequence numbers, in a second plurality of sampling rounds. Step 1108 records in the Mn register the lowest sequence number received in a current sampling round. Step 1110 records in the Mc register, the value of the Mn register, in response to receiving a packet fragment on each link in the current sampling round.

In some aspects, Step 1105 establishes a current sampling round flag register (LS) with a flag for each link. Step 1107 toggles flags in response to receiving a packet fragment on a corresponding link. Then, recording in the Mc register (Step 1110) includes recording the value of the Mn register in the Mc register, after all the flags have been toggled in the current sampling round.

A system and method have been provided tracking network connections in a network where receivers calculate an M value in accordance with RFC-1990. Examples have been given of how the invention would be used in particular exemplary situations. However, other variations and embodiments of the invention will occur to those skilled in the art.

We claim:

1. In a packet information network, a signal bearing medium tangibly embodying a program of machine-readable instructions executable by a digital processing apparatus to perform a method for tracking received packet fragments, the method comprising:
    receiving packet fragments in a plurality of sampling rounds;
    for a current sampling round, recording which links have supplied a packet fragment; and,
    advancing a record of the received packet fragments in response to receiving a packet fragment on each link in the current sampling round.

2. The method of claim 1 wherein receiving packet fragments includes receiving a first plurality of packet fragments with a corresponding first plurality of sequence numbers; and,
    wherein advancing a record of the received packet fragments includes recording the lowest sequence number in the completed current sampling round.

3. The method of claim 2 further comprising:
    for the current sampling round, establishing a flag register with a flag for each link;
    establishing a next lowest sequence number (Mn) register; and,
    establishing a current lowest sequence number (Mc) register.

4. The method of claim 3 wherein recording which links have supplied a packet fragment in the current sampling round includes toggling a flag register flag in response to receiving a packet fragment on a corresponding link;
    wherein advancing a record of the received packet fragments includes:
    recording in the Mn register the lowest sequence number received in the current sampling round; and,
    recording in the Mc register, the value of the Mn register, in response to all the flags being toggled in the current sampling round.

5. The method of claim 4 further comprising:
    resetting the flag register after all the flags have been toggled.

6. The method of claim 5 further comprising:
    toggling a flag register flag in response to receiving a packet fragment on a corresponding link in a subsequent sampling round;
    recording in the Mn register the lowest sequence number received in the subsequent sampling round; and,
    recording in the Mc register, the value of the Mn register, in response to all the flags being toggled in the subsequent sampling round.

7. The method of claim 4 further comprising:
    determining which links have failed to supply a packet fragment in each sampling round.

8. The method of claim 4 wherein receiving packet fragments includes receiving packet fragments on a plurality of T1 lines.

9. In a packet information network, a signal bearing medium tangibly embodying a program of machine-readable instructions executable by a digital processing apparatus to perform a method for tracking received packet fragments, the method comprising:
    establishing a next lowest sequence number (Mn) register;
    establishing a current lowest sequence number (Mc) register;
    receiving packet fragment with sequence numbers, in a plurality of sampling rounds;
    recording in the Mn register the lowest sequence number received in a current sampling round; and,
    recording in the Mc register, the value of the Mn register, in response to receiving a packet fragment on each link in the current sampling round.

10. The method of claim 9 further comprising:
    establishing a current sampling round flag register with a flag for each link;
    toggling flags in response to receiving a packet fragment on a corresponding link; and,
    wherein recording in the Mc register includes recording the value of the Mn register in the Mc register, after all the flags have been toggled in the current sampling round.

11. In a packet information receiver, a system for tracking received packet fragments, the system comprising:
    a receiver input port connected to a network to receive packet fragments in a plurality of sampling rounds; and,
    a link analyzer having a port connected to the receiver input port to record which links have supplied a packet fragment in each sampling round, and to advance a record of received packet fragments in response to receiving a packet fragment on each link in a current sampling round.

12. The system of claim 11 wherein the receiver input port receives a first plurality of packet fragments with a corresponding first plurality of sequence numbers; and,
    wherein the link analyzer records the lowest sequence number after a packet fragment has been received on each link in the current sampling round.

13. The system of claim 12 further comprising:
    a current sampling round flag register, with a port connected to the link analyzer port, maintaining a flag bit for each link;
    a next lowest sequence number (Mn) register with a port connected to the link analyzer port; and,
    a current lowest sequence number (Mc) register with a port connected to the link analyzer port.

14. The system of claim 13 wherein the link analyzer toggles a flag bit in the flag register in response to receiving a packet fragment on a corresponding link in the current sampling round;
    wherein the link analyzer records in the Mn register, the lowest sequence number received in the current sampling round; and, wherein the link analyzer records in the Mc register, the value in the Mn register, after receiving a packet fragment for each link in the current sampling round.

15. The system of claim 14 wherein flag register toggles all the flag bits in response to receiving a packet fragment on each link in the current sampling round; and, wherein the link analyzer determines that the current sampling round is completed in response to reading the flag bits in the flag register.

16. The system of claim 15 wherein the link analyzer resets the flag register after the current sampling round is completed.

17. The system of claim 14 further comprising:

a plurality of T1 line network connections connected to the receiver input port.

* * * * *